Patented Dec. 29, 1931

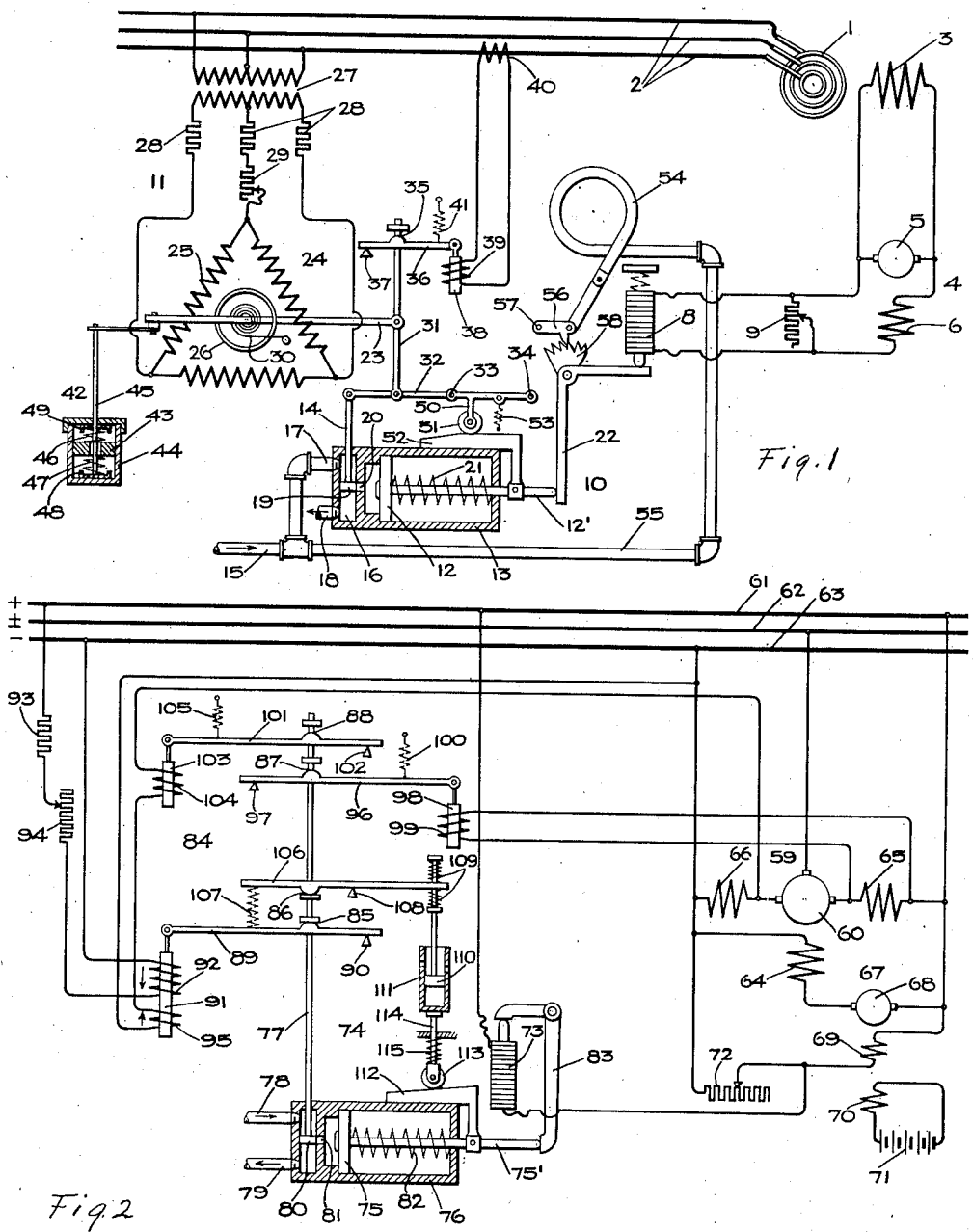

1,839,131

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

REGULATING APPARATUS

Application filed September 6, 1929. Serial No. 390,809.

My invention relates to regulating apparatus and more particularly to electrical regulators arranged to control an electrical condition of an electrical circuit by means of a variable resistance.

It is an object of my invention to provide an improved combination of fluid pressure means and electroresponsive means which is quick acting and stable in its operation for controlling electrical circuit controlling means.

Another object of my invention is to provide an improved regulator comprising fluid pressure means and electroresponsive means for quickly varying the resistance of a compressible rheostat throughout its full operating range, and which, while sensitive, will effectively prevent any tendency on the part of the regulator to hunt.

My invention will be better understood from the following description taken in connection with the accompanying drawings and its scope will be pointed out in the appended claims.

In the drawings, Fig. 1 is a diagrammatic representation of an embodiment of my invention in a regulating system for an alternating current generator, and Fig. 2 shows diagrammatically an embodiment of my invention in a direct-current system.

Referring to Fig. 1 of the drawings which is a diagrammatic representation of a distribution circuit wherein my invention has been embodied, 1 indicates an alternating current dynamo-electric machine which is connected to a distribution circuit 2. The alternating current machine 1 is provided with a field winding 3 which is supplied with an exciting current from a source of direct current shown as a dynamo-electric machine or exciter 4. The exciter 4 comprises an armature 5 which is connected to energize field winding 3, and a field winding 6 which is connected to be energized from the armature 5. A regulating resistor 8 is arranged to control the energization of field winding 6 in order to control an electrical condition such as the voltage, of the alternating current machine 1. By placing the resistor 8 in series or in parallel with the field winding 6, the field current may be either increased or decreased by varying the resistance. As shown, the resistor 8 in this embodiment is connected in series with the field winding 6 and is of the compressible type such as a carbon pile resistance. Means are provided for determining the regulating range of the resistance 8 and as shown in the drawings a convenient arrangement is to connect an adjustable resistance 9 in parallel thereto.

In accordance with my invention I provide means comprising a fluid pressure device 10 for varying the resistance 8, and control the operation of the fluid pressure device by electroresponsive means 11. The fluid pressure device comprises a piston 12 and a piston rod 12' movable within a casing or cylinder 13 to which some suitable fluid such as air or oil may be admitted by the operation of a valve rod 14. The movable parts of the fluid pressure device 10 are preferably made of aluminum in order to minimize the inertia of the moving parts and thereby facilitate quickness of response. I find it desirable to use air as the operating fluid in preference to other fluids because of its flexibility, quickness and cleanliness. The exhaust may be to air and so no return or drain is necessary. For a medium size carbon pile for handling currents up to say 50 amperes, a pressure of 25 pounds per square inch has been found to be sufficient but larger sizes may require a pressure up to 50 pounds per square inch. The air may be contained in a suitable reservoir (not shown) and maintained under pressure by suitable means well known in the art. In the present instance I have shown only the supply pipe 15. The air from the supply pipe 15 enters the valve chamber 16 through a supply conduit 17 and is discharged from the cylinder through an exhaust conduit 18. A valve 19 controlled by the valve rod 14 uncovers a port 20 communicating with the main cylinder to admit air under pressure to a single side of the piston 12, or uncovers the port 20 to discharge air from the cylinder through the exhaust conduit 18. The valve 19 has very little lap, preferably zero lap, and is arranged to uncover quickly the port 20 to air pressure or exhaust as the occasion demands. The opposite side of the piston is subjected to a force biasing the piston to the end of the cylinder at which the air pressure is applied. For this purpose I employ a spring 21 which is in contact with both the piston and the wall of the cylinder 13. The piston 12 is connected to the carbon pile resistance through the piston rod 12' and a lever arm 22 so that as the piston moves under air pressure the carbon pile is compressed and thereby lowers the resistance of the circuit through field winding 6.

The position of the valve 19 and consequently the pressure exerted upon the piston 12 is controlled by the electroresponsive device 11 which is connected to be energized in accordance with the electrical condition to be regulated. Although many well known types of sensitive electroresponsive devices may be used, I find it preferable in alternating current applications to use a regulating device which responds properly under conditions of unbalance in a polyphase system, such as the type described and claimed in United States Letters Patent No. 1,743,798, granted January 14, 1930, upon an application of Robert H. Park, and assigned to the same assignee as the present application. Accordingly, the device 11 in the form shown is provided with an arm 23 which is actuated by a dynamo-electric device 24 comprising a stationary polyphase primary or inducing winding 25 for producing a rotating magnetic field and a rotatable closed circuit secondary or induced winding 26. The winding 25 is connected to be energized from all phases of the circuit 2 through a suitable step-down transformer 27. Resistors 28 are connected in series with each phase of the winding 25 in order to render the operation of the device 11 independent of variations in frequency. An adjustable resistor 29 is also connected in series with one of the conductors in order to provide a means to adjust the device 11 to hold constant the regulated condition at any desired value.

The rotatable member 26 is mechanically connected to actuate the arm 23 and the bearings of the rotatable member form a pivot for this arm. The torque of the rotatable member 26 under predetermined normal conditions in the regulated circuit is counterbalanced by the torque of a spring 30. The winding 25 may be arranged on the inner periphery of a stator core member of the type employed for induction motors in the usual manner of a polyphase distributed winding, and the rotor member 26 is preferably constructed in the form of a hollow steel shell. The arm 23 is connected to actuate the valve 19 by means of a link 31 and a lever arm 32. The link 31 is fulcrumed at an intermediate point to one end of the arm 23. The lever arm 32 is fulcrumed at an intermediate point to one end of link 31 and just beyond this point is divided into two parts by a hinged pivot 33. A stationary fulcrum point 34 is provided at the end of the arm 32 beyond the hinged pivot 33. The end of the arm 32 opposite the stationary fulcrum point is connected to the arm 14 of the valve 19. Means are provided for modifying the action of the electroresponsive device 11 in case the current traversing the distribution circuit 2 exceeds a predetermined value. As illustrated, the end of link 31 opposite the end connected to the lever arm 32 is provided with a fulcrum 35. A lever arm 36 is positioned at a point intermediate its ends with a predetermined clearance between the fulcrum 35 and the lever arm and in a position to raise the link 31. The lever arm 36 is provided at one end with a stationary fulcrum 37 and at the other end with electromagnetic operating means comprising a plunger 38 and an operating winding 39 connected to be energized in accordance with the current traversing the distribution circuit 2 through a suitable current transformer 40. A spring 41 is provided for balancing the weight of the plunger 38.

In order to stabilize the action of the regulator it is necessary to add means for preventing hunting. The means which I have found to be suitable includes means for damping the action of the arm 23 and as shown comprises a dashpot 42. The dashpot 42 is arranged to permit a quick initial movement of lever 23 followed by a damping action and comprises a disk or piston 43 movable within a cylinder 44, and a shaft 45 slidably extending through said piston and resiliently connected thereto by springs 46 and 47 which bear on opposite sides of the piston and which are forced into engagement therewith by retaining members 48 and 49. The action of the arm 23 is also modified by a change in position of an auxiliary movable fulcrum for the arm 32 which changes its position in accordance with the position of the piston 12. The arm 32 is provided with a suitable extension 50 between the hinged pivot 33 and the stationary fulcrum point 34 which forms a pivot for a bearing which is preferably of the rotatable type and shown as a roller 51. The roller 51 engages with an inclined plane designated as a sloped rider 52 which is rigidly fastened to the piston rod 12' and is arranged to lower the point of contact between the roller and the rider when the piston moves in a direction to compress the carbon pile 8. As shown, the operating surface of the rider is inclined to the longitudinal axis of the piston 12. A resilient means shown as a spring 53 is employed to urge the roller 51 into positive engagement with the sloped surface of the rider 52 and thereby change the position of the hinged pivot 33. The operation effected by the sloped rider and the associated parts just described thus constitutes a follow-up device which tends to prevent overtravel of the piston and consequent hunting of the regulating mechanism.

Means are also provided for preventing an abnormal increase in the resistance of the carbon pile 8 in case the fluid pressure decreases below a predetermined value or fails. For this purpose I provide a pressure responsive device which as illustrated in the drawings comprises an expansion loop 54 in a pipe 55 connected to the supply pipe 15. The free end of the loop 54 is provided with a pawl 56 which is hinged thereto and pivoted at a stationary point 57. The pawl 56 is arranged to engage a ratchet member 58 rigidly secured to the compression arm 22 in case the air pressure decreases below a predetermined value to maintain the rheostat under compression. It will occur to those skilled in the art that other pressure responsive devices, such as the device known in the art as the sylphon, could be utilized to restrain the movement of the lever 22 in case of a failure of pressure without departing from my invention in its broader aspects.

The operation of the illustrated embodiment of my invention shown in Fig. 1 is substantially as follows: Assume that air under pressure has been supplied through the supply pipe 15 to the supply conduit 17, and that the dynamo-electric machine 1 and its exciter 4 are in operation. With the application of pressure the pawl 56 is moved away from its cooperating ratchet 58 due to the expansion in the loop 54 and thus permits the lever 22 to assume any operating position in accordance with the movement of piston 12. It will be assumed for the moment that the piston 12 has moved lever 22 so as to compress the carbon pile resistance 8 in a manner to change the energization of the field winding 3 sufficiently to permit the generator 1 to generate the predetermined normal voltage to be maintained in the distribution circuit 2. Now if the voltage in one or all of the phases of the distribution circuit 2 decreases below the predetermined normal value to be maintained, due to an increase in load for example, the rotor 26 of the electroresponsive means 11, rotates in a clockwise direction, as viewed in the drawings, under the bias of the spring 30. This movement lowers the right-hand end of the lever arm 23, as viewed in the drawings, thereby moving the valve 19 to open the port 20 to admit air under pressure to the piston 12.

The air pressure rises in the cylinder and moves the piston 12 in a direction to increase the pressure on the carbon pile resistance and thereby increases the field excitation of the generator 1 to bring the voltage of the distribution circuit 2 back to the predetermined normal value. Upon a rise in voltage the valve 19 opens the port 20 to the exhaust port 18 and the pressure acting against the piston 12 decreases until valve 19 is moved to close port 20 when the voltage of circuit 2 returns to the predetermined normal value.

Just as soon as the rotor 26 starts to turn in a clockwise direction following the first assumed decrease in voltage, the left-hand end of the lever arm 23 moves in a direction to compress the spring 47 of the dashpot 42. This permits immediate movement of the lever arm 23 and consequently the valve 19, but as soon as the compression on the spring 47 attains a predetermined value the movement of the lever arm 23 is damped by the movement of the piston 43 of the dashpot in its damping medium to a degree depending upon the seepage in the dashpot. However, as the piston 12 of the pressure device starts to move under the increased pressure the rider 52 also moves and the point of engagement of the roller 51 therewith is lowered under the action of spring 53. This action lowers the hinged pivot 33 and checks the downward movement of the valve 19 so that the valve is restored to the position to close the port 20, thereby bringing the piston 12 to rest. If the voltage of circuit 2 should increase instead of decrease, the operation of the parts described above would be similar but in the opposite direction. By adjusting the slope of the rider 52 and the seepage in the dashpot, hunting can be substantially eliminated and the whole regulating arrangement can be brought to rest very quickly.

In case the current traversing the distribution circuit 2 exceeds a predetermined value, due for example to an overload or short circuit, the operating winding 39 pulls up on the end of its associated lever arm 36 to take up the clearance to the fulcrum 35 and eventually exerts an upward pull on the valve rod 14. This action closes the port 20 to the supply conduit 17 and opens the port 20 to the exhaust conduit 18 thereby decreasing the pressure on the piston 12 and consequently the pressure on the carbon pile resistance 8. As a result the excitation of the generator 1 is not increased as would ordinarily occur with a large drop in voltage and the field excitation is controlled so as to limit the current supplied by the generator to a safe value.

It will be observed that the electroresponsive device 11 has the same voltage impressed across its terminals after the pressure has been increased on the carbon pile resistance as before the assumed change in voltage occurred, but that the rotor 26 now rests in a different position. The spring 30 is so adjusted and arranged that an angular change in the position of the rotor of a predetermined amount, for example 5 degrees, does not change the magnitude of the clockwise torque produced by the spring. With the restraining system so designed, the carbon pile resistance can be used through its whole operating range with the same impressed voltage on the electroresponsive device 11.

In Fig. 2 of the drawings I have shown a modification of the embodiment of my invention which is applicable for use in connection with the regulation of direct current machines or circuits. For purposes of illustration I have shown a three-wire direct-current generator 59 having an armature 60 which is connected to energize a three-wire distribution circuit comprising a positive conductor 61, a neutral conductor 62 and a negative conductor 63. The generator 59 is provided with a shunt field winding 64 and series field windings 65 and 66 connected in series relation with a circuit to the positive conductor 61 and the negative conductor 63, respectively. In circuit with the shunt field winding 64 I connect a motor 67 having an armature 68 arranged to control by its counter-electromotive force the energization of field winding 64. The motor 67 is provided with a shunt field winding 69 and a field winding 70 preferably excited from a constant source of direct current shown as a battery 71. The field winding 70 and constant source of excitation therefor is to establish the polarity of generator 1 and insure against reversal of polarity. An adjustable resistor 72 is connected in series with the motor field winding 69 for making initial adjustments or for hand control. A carbon pile resistance 73 is connected in parallel relation with the field winding 69 for automatically controlling the counter-electromotive force of the motor 67 and thereby the field excitation of the generator 59.

In accordance with my invention a fluid pressure device 74, similar in construction to the fluid pressure means illustrated in Fig. 1, is provided for controlling the carbon pile resistance 73, and comprises a piston 75 and piston rod 75' movable within a cylinder 76 to which air under pressure is admitted and controlled by a valve rod 77. The air enters through a supply conduit 78 and is discharged through an exhaust conduit 79. A valve 80 operated by the valve rod 77 controls the opening of a port 81 leading into the main cylinder so as to admit air under pressure to the piston 75, or to open the port to the exhaust conduit 79 and thereby reduce the pressure in the cylinder. A spring 82 is arranged to bear on the opposite side of the piston and against the wall of the cylinder for the purpose of biasing the piston to the end of the cylinder at which pressure is applied. The piston 75 is connected to the carbon pile resistance through the piston rod 75' and a lever arm 83.

The position of the valve 80 and consequently the pressure exerted upon the piston 75 is controlled by electroresponsive means 84 which is connected to be energized in accordance with an electrical condition of the circuit comprising conductors 61, 62 and 63. A current limiting feature is also employed to modify the action of the electroresponsive device in case the current supply from the generator 59 exceeds a predetermined value such as may be occasioned by overload or short circuit conditions. The valve rod 77 is provided with a plurality of fulcrum points 85, 86, 87 and 88. A lever arm 89 is positioned at a point intermediate its ends against the fulcrum 85 and in a position to support the valve rod 77, and is provided at one end with a stationary fulcrum 90 and at the other end with electromagnetic operating means. The electromagnetic operating means comprises a plunger 91 attached to the lever arm 89 and an operating winding 92 connected to be responsive to the voltage across the positive and negative conductors of the distribution circuit. A current limiting resistor 93 and an adjustable resistor 94 for determining the value of the voltage to be held across the outside conductors are connected in series with the coil 92. An additional operating winding 95 acting differentially with respect to the winding 92 is connected to be energized in accordance with the current traversing the armature 60 of generator 59 to give the generator a drooping voltage characteristic as the load increases and thereby facilitate the operation of generator 59 in parallel with other similar generators (not shown). Another lever arm 96 is positioned at a point intermediate its ends with a predetermined clearance between the fulcrum 87 and the lever arm and in a position to raise the valve rod 77, and is provided at one end with a stationary fulcrum 97 and at the other end with electromagnetic operating means comprising a plunger 98 connected thereto and an operating winding 99 connected to be energized in accordance with the current traversing the series field winding 65. Means for counter-balancing the weight of the plunger 98 is provided at the end of the lever 96 opposite the stationary fulcrum and as shown comprises a spring 100 connected to the lever and to some convenient point on the regulator frame. Similarly, a lever arm 101 is positioned at a point intermediate its ends with a predetermined clearance between the fulcrum 88 and the lever arm and in a position to raise the valve rod 77, and is provided at one end with a stationary fulcrum 102 positioned on the opposite side of arm 77 with respect to the stationary pivot 97 of the lever arm 96. Electromagnetic operating means is provided for actuating the free end of lever 101 and comprises a plunger 103 connected thereto and an operating winding 104 connected to be energized in accordance with the current traversing the series field winding 66. It will be observed that the winding 104 is connected in series with the operating winding 95 of the lever arm 89. A counterbalancing spring 105 is connected to the lever arm 101 near the end to which the plunger 103 is connected.

In order to stabilize the action of the regulator I provide an anti-hunting arrangement which is a modification of the arrangement shown in Fig. 1. In this instance a lever arm 106 is positioned at a point intermediate its ends against the fulcrum 86 and in a positon to oppose an upward movement of the valve rod 77, as viewed in the drawings, in contradistinction to the position of the lever arms 89, 96 and 101 which are positioned to oppose a downward movement of the valve rod 77 as viewed in the drawings. The left-hand end of the lever arm 106 is connected by a spring 107 to the left-hand end of lever 89. On the opposite side of the fulcrum 86 a stationary pivot 108 is provided. Beyond the stationary pivot the lever arm 106 is connected by means of light springs 109 to a dashpot comprising a disk or piston 110 movable within a cylinder 111. The cylinder of the dashpot is mounted to ride on a sloped rider 112 which is rigidly fastened to the piston rod 75'. A rotatable bearing 113 is provided on a rod 114 extending from the dashpot cylinder and the rotatable bearing is biased to engage the sloped surface of the rider by resilient means shown as a spring 115.

The operation of the embodiment of my invention illustrated in Fig. 2 is substantially as follows: Assume that air under pressure has been supplied from the supply conduit 78 through the port 81, and that the generator 59 is in operation. It will be assumed for the moment that the piston 75 has moved lever 83 so as to compress the carbon pile resistance 73 in a manner to change the energization of the motor 67 so that its counter-electromotive force is of a value to permit the proper current to flow in the field winding 64 so that the voltage of generator 59 is at the desired value. Now if the voltage between the conductors 61 and 63 decreases due to an increase in load, the left hand end of lever 89 drops due to the action of gravity and moves the valve rod 77 in a direction to open the port 81 to the supply conduit 78 and thereby increase the pressure acting on the piston 75. It will be observed that due to the clearance between the current operated levers 96 and 101 and the fulcrum points 87 and 88 respectively on the valve rod 77 the current operated levers have no effect on the operation of the valve 80 unless the current in either or both of the series field windings exceeds a predetermined value. When the valve rod 77 drops due to the decrease in voltage the pressure on the piston is increased and consequently the pressure on the carbon pile resistance 73 is increased. As a result, the resistance in parallel to the motor field winding is decreased and as a consequence less current traverses the motor field winding 69, thereby decreasing its counter-electromotive force and increasing the current circulating in the field winding of generator 59 in a manner to return the voltage of the distribution circuit to normal. As the load upon generator 59 increases, the auxiliary coil 95 acting differentially with the voltage coil 92 tends to modify the pull on the voltage lever 89 so that the voltage of the generator has a drooping characteristic as the load increases.

When the voltage starts to decrease in the first instance the end of lever 106 attached to the dashpot rises under the pull of spring 107 which is stressed by the lowering of the solenoid operated end of the voltage lever. The upward movement of the right-hand end of lever 106 is restrained only lightly by the upper spring 109 and the piston 110 of the dashpot starts to move up. At the same time the piston 75 of the fluid pressure device is moving outward and carries the rider 112 with it. Depending upon the seepage in the dashpot and the pull of the spring 115 on the roller bearing 113, the dashpot piston tends to follow the cylinder 111 thereby pulling down on the springs 109 and partially restoring the arm 89 to its neutral position due to the upward pressure exerted by the spring 107. The reverse action occurs with a rise in voltage. By adjusting the slope of the rider and the seepage in the dashpot, hunting can be substantially eliminated and the system can be brought to rest very quickly.

In case the current traversing the series field winding 65 or 66 exceeds a predetermined value, due for example to an overload or short circuit, either operating winding 99 or 104 pulls up on the end of its associated lever arm to take up the clearance between each lever and its fulcrum point and eventually exerts an upward pull on the valve rod 77. This action closes the port 81 to the supply conduit 78 and opens the port 81 to the exhaust port opening 79, thereby decreasing the pressure on the piston 75 and consequently the pressure on the carbon pile resistance 73. As a result the counter-electromotive force of motor 67 is not decreased with an abnormal decrease in voltage as would ordinarily occur, but the field excitation of generator 59 is decreased to limit the current supplied by the generator to a safe value.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a variable rheostat, fluid pressure means including a movable member for controlling said rheostat, electroresponsive means including a movable element for controlling said movable member, damping means connected to said movable element, resilient means interposed between said damping means and said movable element, a cam member arranged to be actuated by said movable member, and means coacting with said cam member and said movable element for urging said movable element to a predetermined position during any departure therefrom, the slope of said cam being arranged to decrease the deflection of said resilient means in accordance with the movement of said movable member upon any movement of said movable element independently of said damping means and effect return of said movable element to a substantially freely floating position for preventing hunting of said electroresponsive means and said fluid-pressure means.

2. In combination, a variable rheostat, fluid pressure means including a movable member for controlling said rheostat, electroresponsive means including a movable lever for controlling said movable member, means connected to and retarding the operation of said lever, resilient means interposed between said last-mentioned means and said lever, a cam member having a predetermined slope to the longitudinal axis of said movable member and arranged to be moved in accordance with the movement of said movable member, and means coacting with said cam member and said lever so as to decrease the deflection of said resilient means upon any departure from its unstressed condition for urging said lever to a substantially freely floating position during any departure therefrom.

3. In combination, a compressible rheostat, fluid pressure means including a movable piston for varying the pressure on said rheostat, electroresponsive means including a movable lever for controlling the movement of said piston, a dashpot having a disk connected to said lever, resilient means interposed between said lever and said disk which is normally unstressed when said lever is in a freely floating position, a sloped rider rigidly connected to said piston and having a surface with an angle of inclination such that a movable descending surface with respect to said lever is provided when said piston moves in a direction to compress said rheostat, and a lever arm arranged to pivot on the inclined surface of said rider and connected to said movable lever so as to decrease the deflection of said resilient means upon any departure from its unstressed condition in proportion to the movement of said piston from its minimum compression position for preventing hunting of the rheostat operating means.

4. In combination, a variable rheostat, fluid pressure means for controlling said rheostat, a fluid pressure supply for said fluid pressure means, electroresponsive means for controlling said fluid pressure means, and means for restraining said rheostat from changing its resistance in accordance with the operation of said fluid pressure device when the pressure of said fluid pressure supply decreases below a predetermined value.

5. In combination, a compressible rheostat, fluid pressure means for controlling said rheostat, a fluid pressure supply for said fluid pressure means, electroresponsive means for controlling said fluid pressure means, and means responsive to the pressure of said fluid pressure supply for maintaining said rheostat under compression when the pressure in said fluid pressure supply fails.

6. In combination, a compressible rheostat, a piston movable within a cylinder for varying the pressure on said compressible rheostat, a fluid pressure supply for actuating said piston, said cylinder having a port communicating with said fluid pressure supply and with the atmosphere for conducting fluid to and from a single side of said piston, a single slide valve having substantially zero lap for controlling said port opening, a spring for biasing said piston toward its minimum pressure position, and electroresponsive means for controlling said valve.

7. In combination, a carbon pile resistance, a movable arm for controlling said resistance, a fluid pressure device for operating said movable arm, a fluid pressure supply for said fluid pressure device, electro-magnetic means for controlling said fluid pressure device, auxiliary means responsive to the pressure of said fluid pressure supply, a ratchet rigidly connected to said movable arm, and a pawl arranged to be operated by said auxiliary pressure responsive means so as to engage said ratchet and hold said arm in a position to compress said carbon pile when the pressure in said supply decreases below a predetermined value.

8. In combination, an electric circuit, a variable rheostat for controlling an electrical condition of said circuit, a fluid pressure device for controlling said rheostat, electroresponsive means for controlling said fluid pressure device in accordance with said electrical condition, and means for modifying the action of said electroresponsive device in accordance with another electrical condition of said circuit.

9. In combination, an electric circuit, a compressible rheostat for controlling the voltage of said circuit, a fluid pressure device for controlling the pressure on said rheostat, means connected to be responsive to the voltage of said circuit for controlling said fluid pressure device, and means connected to be responsive to the current traversing said circuit for modifying the action of said voltage responsive means when the current in said circuit exceeds a predetermined value.

10. In a system of distribution, a distribution circuit, a dynamo-electric machine connected thereto and having an exciting winding, a compressible rheostat for controlling the energization of said exciting winding, a fluid-pressure device including a movable member for controlling the compression of said rheostat, a fluid presure supply for said fluid pressure device, electroresponsive means including a movable element for controlling said fluid pressure device in accordance with an electrical condition of said circuit, means for maintaining said rheostat under compression when the pressure of said fluid pressure supply decreases below a predetermined value, and means jointly operative in accordance with the operation of said movable member and said movable element for modifying the operation of said electroresponsive means to prevent hunting of said means controlling said rheostat.

11. In a system of distribution, a distribution circuit, a dynamo-electric machine connected thereto and having an exciting winding, a carbon pile rheostat for controlling the energization of said exciting winding, a piston movable within a cylinder for varying the compression of said carbon pile, a source of compressed air for actuating said piston, said cylinder having a port communicating with said source of compressed air and the atmosphere for conducting fluid to and from a single side of said piston, a pilot valve having substantially zero lap for controlling said port opening, a spring for biasing said piston toward its minimum pressure position, electroresponsive means including a movable lever for controlling said pilot valve in accordance with the voltage of said distribution circuit, means responsive to current in said distribution circuit above a predetermined value for modifying the operation of said movable lever, means responsive to the pressure of said source of compressed air for maintaining said carbon pile under compression when the pressure in said supply decreases below a predetermined value, a dashpot having a disk resiliently connected to said lever, a sloped rider rigidly connected to said piston and having a surface with an angle of inclination such that a movable descending surface with respect to said movable lever is provided when said piston moves in a direction to compress said rheostat, and a lever arm arranged to pivot on the inclined surface of said rider and connected to said movable lever for preventing hunting of the rheostat operating means.

In witness whereof, I have hereunto set my hand this 5th day of September, 1929.

LOUIS W. THOMPSON.